United States Patent [19]

King, Jr.

[11] 3,962,775

[45] June 15, 1976

[54] METHOD OF FORMING A JOINT USING A GUIDE FASTENER

[76] Inventor: John O. King, Jr., 3990 N. Ivy Road, Atlanta, Ga. 30342

[22] Filed: Jan. 17, 1975

[21] Appl. No.: 542,076

[52] U.S. Cl. .................................. 29/445; 29/525; 29/526; 72/392; 72/476; 85/1 P; 85/5 R; 85/7; 151/41.73
[51] Int. Cl.² .......................................... B23P 9/00
[58] Field of Search ................ 29/445, 525, 526 X; 72/370, 377, 391, 392 X, 476 X; 151/41.73 X; 85/1 PX, 5 RX, 7 X; 15/104.05, 104.06 R

[56] References Cited
UNITED STATES PATENTS

| | | | |
|---|---|---|---|
| 1,115,307 | 10/1914 | Guffee | 85/1 P |
| 1,394,608 | 10/1921 | Davern | 85/1 R UX |
| 2,053,918 | 9/1936 | Peretzman | 85/1 P X |
| 2,424,087 | 7/1947 | Focke et al. | 29/526 UX |
| 2,895,367 | 7/1959 | Nagy | 85/5 R X |
| 2,978,946 | 4/1961 | Looker | 85/5 R |
| 3,208,328 | 9/1965 | Myers | 29/526 UX |
| 3,434,327 | 3/1969 | Speakman | 151/41.73 UX |
| 3,661,406 | 5/1972 | Mele | 151/41.73 X |
| 3,779,127 | 12/1973 | Speakman | 85/7 |

Primary Examiner—Charlie T. Moon
Attorney, Agent, or Firm—B. J. Powell

[57] ABSTRACT

A fastener/guide assembly and method including a fastener having a head, a bearing section to be extended through aligned holes in work pieces, and an engagement section opposite the head; and a guide member having a pilot section sized to extend through the holes to center the guide member in the holes, an expansion section trailing the pilot section sized to expand the holes, and locating means for locating the leading end of the fastener concentrically about the axis of the guide member so that the fastener follows the guide member through the holes.

6 Claims, 36 Drawing Figures

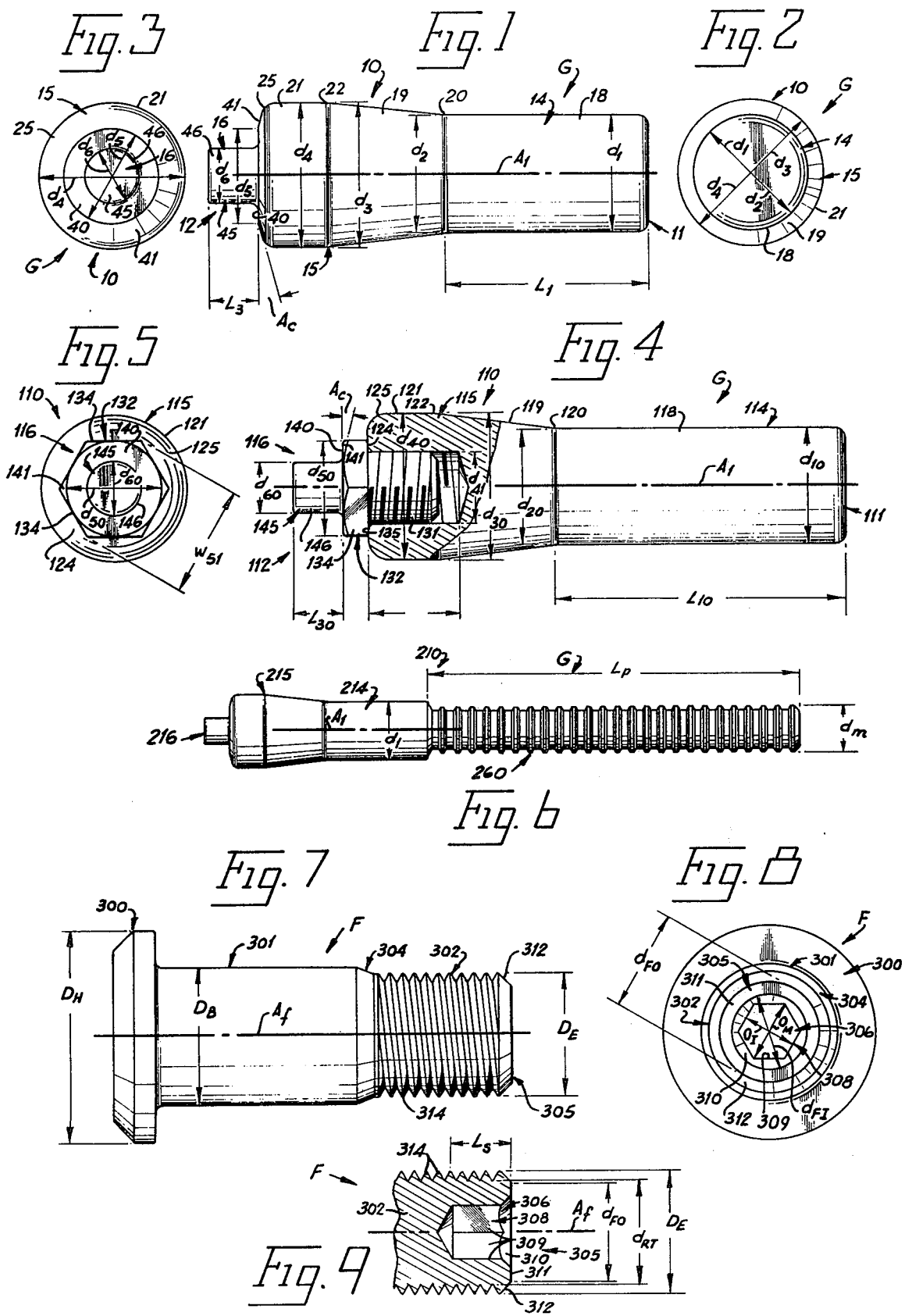

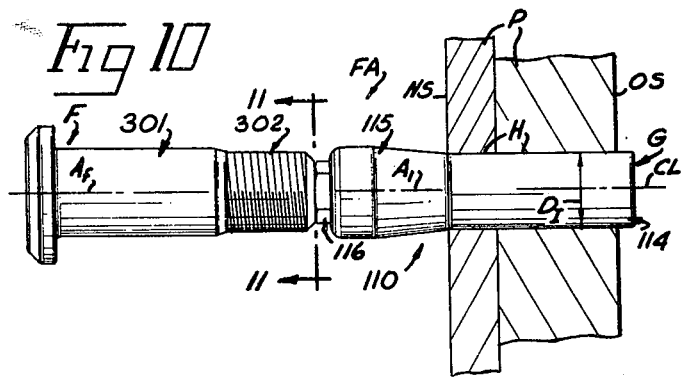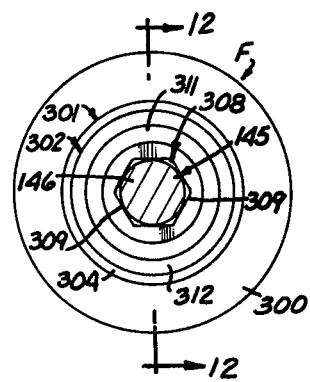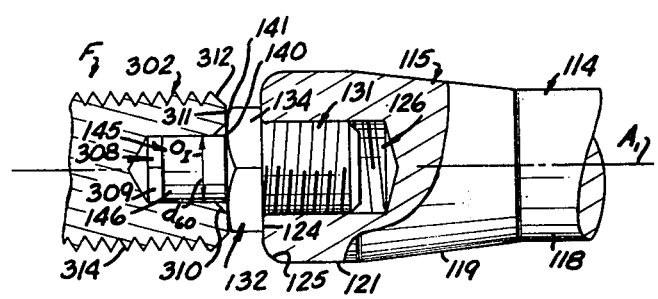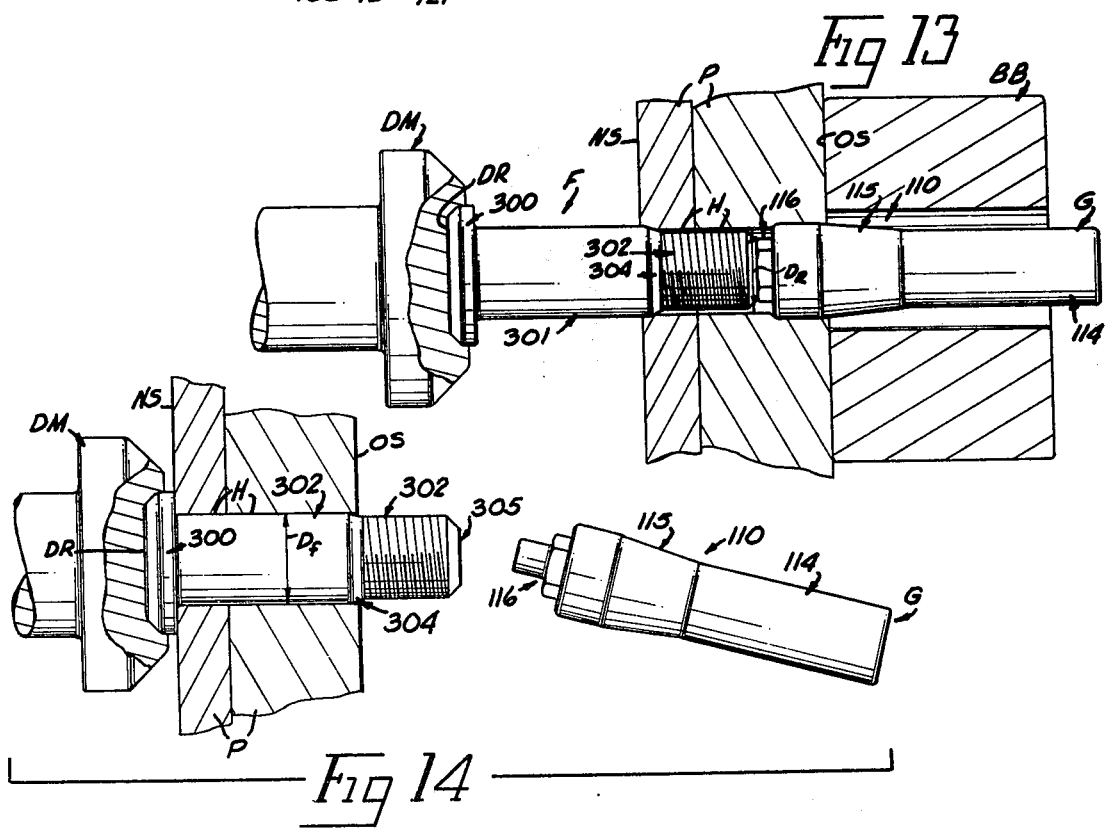

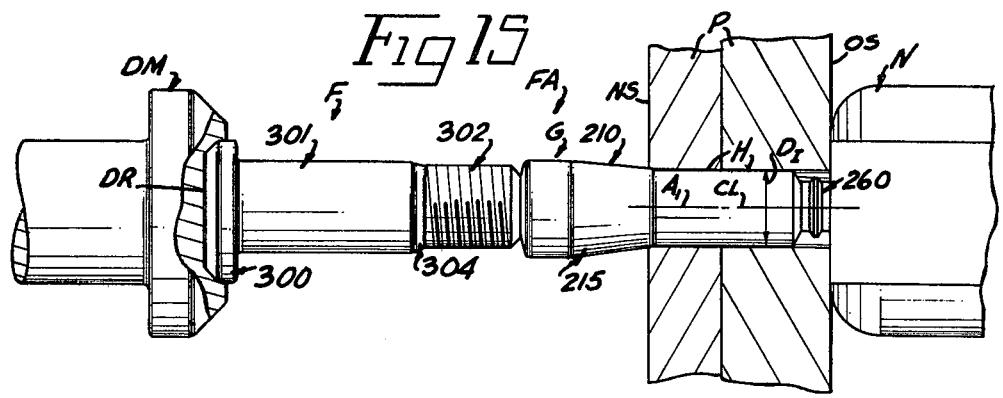
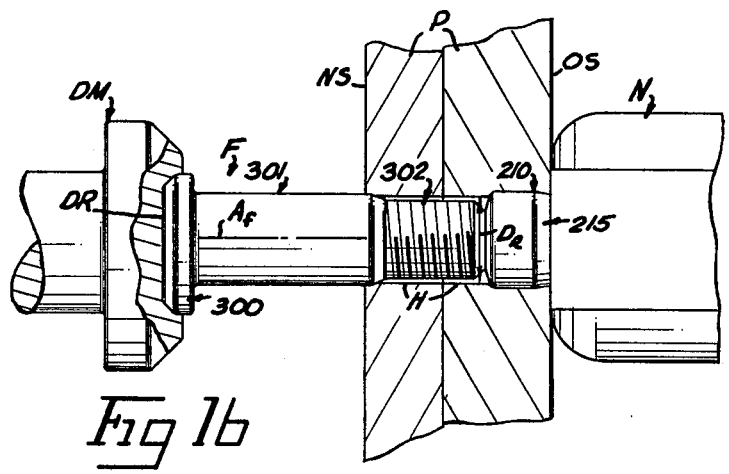
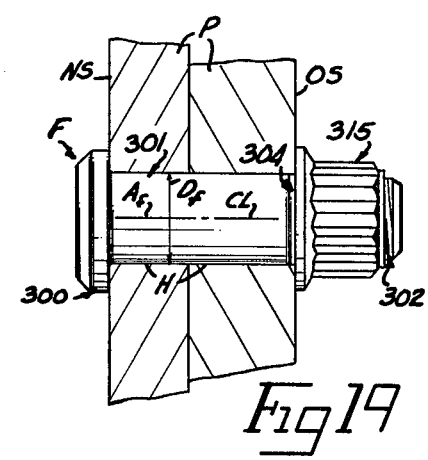
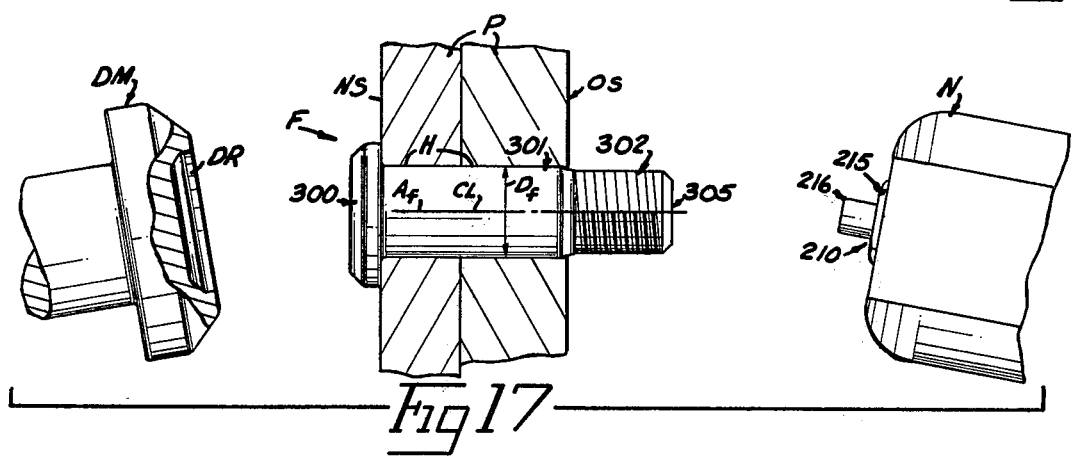
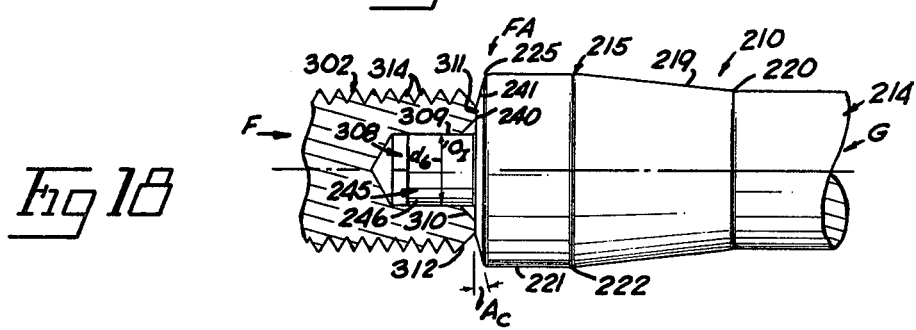

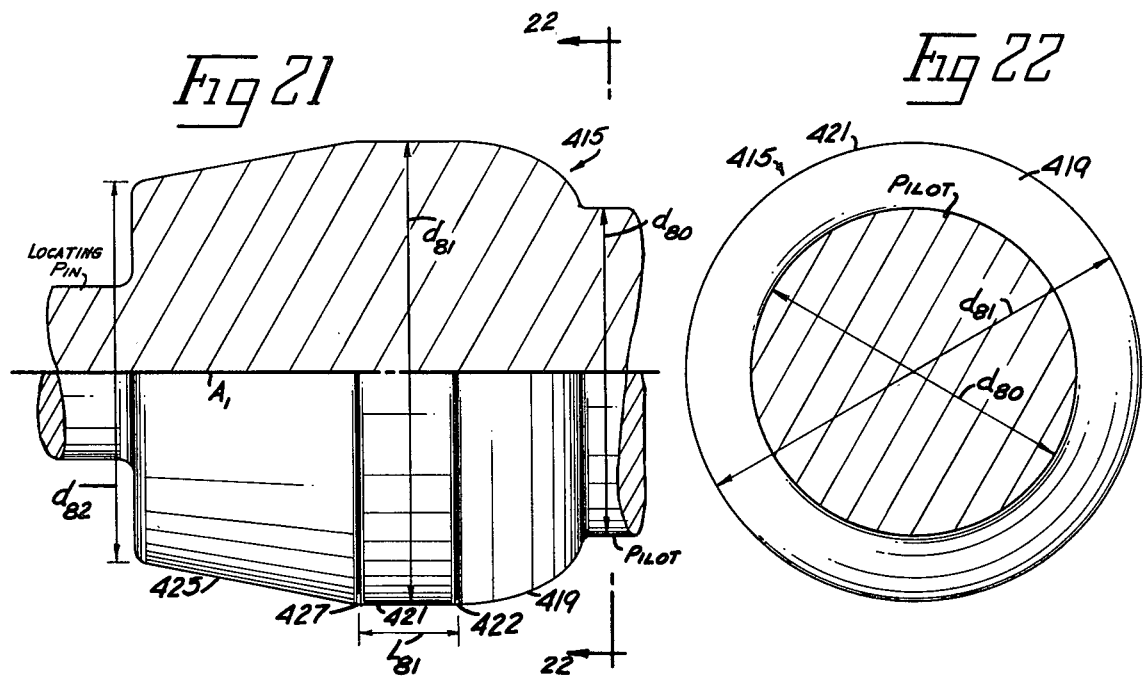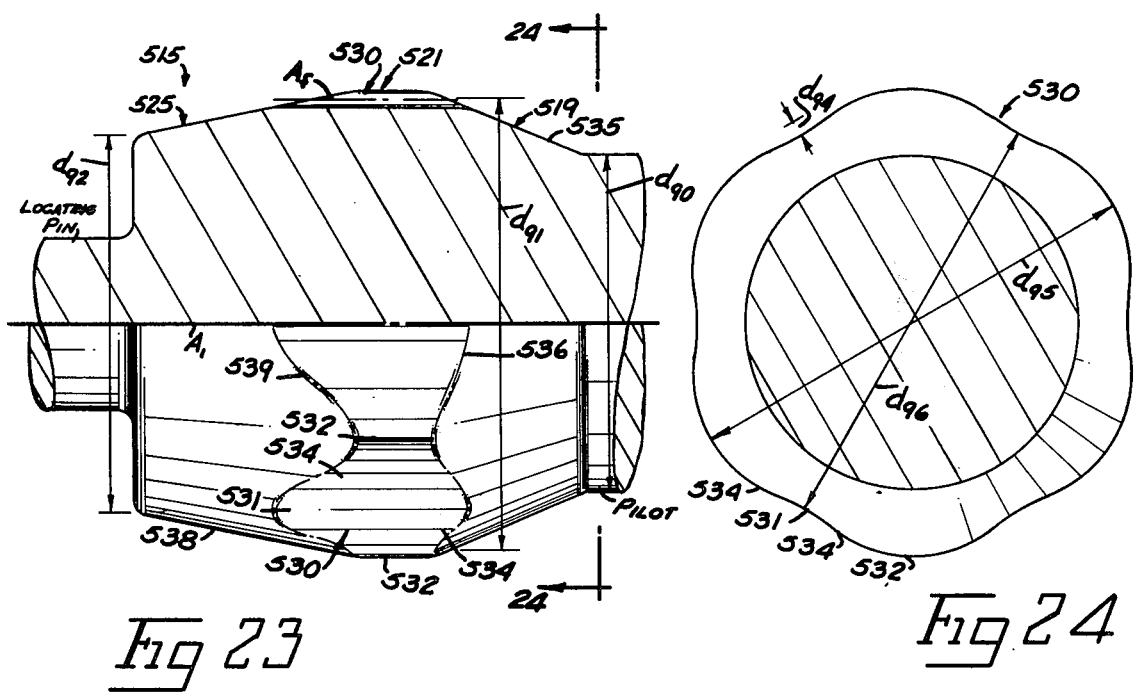

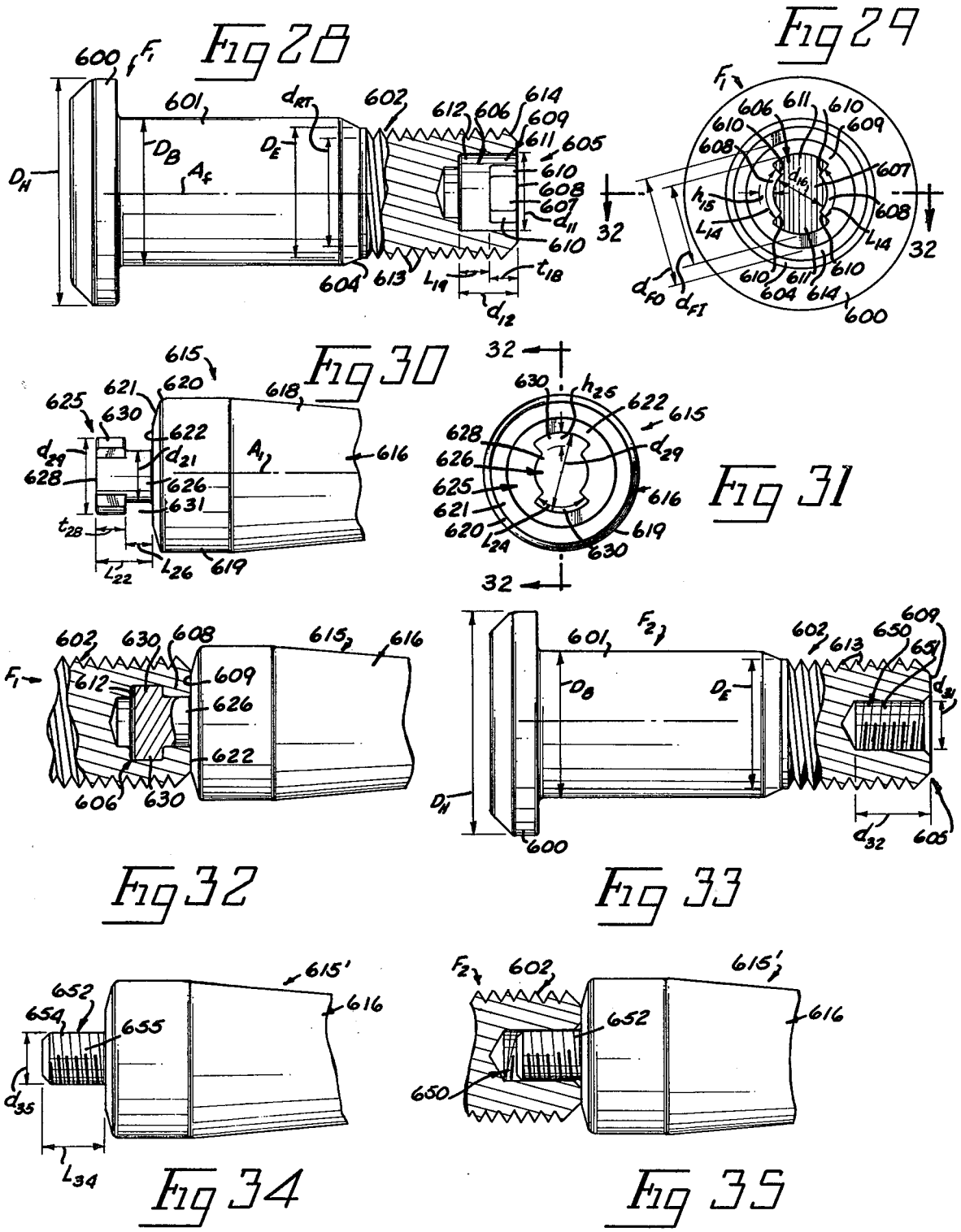

3,962,775

METHOD OF FORMING A JOINT USING A GUIDE FASTENER

BACKGROUND OF THE INVENTION

As fastener joints and work pieces have become more highly stressed, especially in the aerospace industry, a great deal of effort has been expended in an attempt to produce a joint which has optimum strength together with optimum fatigue life. One technique which has been used is commonly known as an interference fit where the diameter of the shank of a fastener is greater than the nominal diameter of the holes in which it is to be fitted. Another technique that has been used is commonly known as coldworking wherein the hole is expanded to such an extent that the metal immediately surrounding the holes where the localized expansion occurs is compressed beyond its compressive yield point and after which the hole is permitted to return toward its original diameter to establish a compressive stress gradient immediately surround the hole. Such techniques have also been combined to insure that a prescribed amount of interference fit is obtained upon installation of the fastener. Several techniques which coldwork the holes as a separate operation are disclosed by U.S. Pat. Nos. 3,434,327; 3,566,662; and 3,805,578. Techniques which use a special fastener that combine the coldworking technique with the interference fit technique are illustrated in U.S. Pat. Nos. 3,578,267 and 3,779,127. One of the advantages that are associated with the two-step technique of first coldworking the hole and subsequently installing a fastener therein is that it is difficult to prevent the engagement portion of the fastener such as the threads or locking grooves from contacting the inside of the hole to damage it as the fastener is driven into the hole during installation. One of the objections when using the special fastener which combines the coldworking of the hole and the interference fit in a single operation is that a non-standard fastener is required and that a non-standard locking means such as a nut or collar are usually used to retain these fasteners in position. These special fasteners also have encountered difficulties in maintaining the engagement means on the projecting end of the fastener from contacting the hole wall during the installation operation to damage same. Because of variance in grip lengths required for a fastener, these special fasteners have frequently left part of the major expansion section in the holes to generate a local higher stressed condition that increases undesirable stress corrosion levels.

SUMMARY OF THE INVENTION

These and other problems and disadvantages associated with the prior art are overcome by the invention disclosed herein by providing an assembly which utilizes a standard fastener thereby minimizing the cost of using the invention, which is able to provide both the coldworking of the hole and the interference fit of the fastener with the hole in a single operation, and which maintains the fastener centered in the hole during installation to prevent the engagement section on the fastenerd from contacting the hole wall and damaging it. Thus, the invention is able to provide the desirable characteristic of both coldworking and interference fit with a standard fastener while at the same time eliminating special fasteners and locking means for attaching the fastener into position.

The apparatus of the invention includes an expansion guide member which has a pilot section on the leading end thereof sized to just be slidably received through the initial holes in the work pieces together with an expansion section having an expansion surface thereon with a major diameter larger than the diameter of the holes that serves to enlarge the holes as the guide member is forced therethrough. The guide member has a locating pin on the trailing end thereof which is adapted to be received into a central opening in the leading end of a conventional fastener. The fastener has an engagement section at the leading end thereof adapted to be engaged by a locking member to lock the fastener into position followed by a bearing section which is to be placed within the holes when the fastener is finally installed followed by a head which engages one side of the work pieces. Thus, it will be seen that the locating pin in the trailing end of the guide member serves to maintain the engagement section of the fastener centered within the holes as the guide member and fastener are forced through the holes while the expansion section enlarges the holes to the desired diameter. The locating pin in the trailing end of the guide member may be removably attached thereto so that the locating pin can be removed therefrom without destroying the complete guide member if the locating pin becomes damaged or broken. Also, with the locating pin separate, the maximum toughness can be provided in the locating pin to prevent its breakage while the hard surface of the guide member may be maintained. Also, a pulling section may be provided on the leading end of the guide member to be used in connection with a conventional lockbolt installation gun to assist in forcing the guide member through the holes as the fastener is forced thereinto trailing the guide member.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 1 is a side elevational view of a first embodiment of the invention;

FIG. 2 is a front end view of that embodiment of the invention seen in FIG. 1;

FIG. 4 is a side elevational view shown partly in cross-section of a second embodiment of the invention;

FIG. 5 is a rear end view of that embodiment of the invention shown in FIG. 4;

FIG. 6 is a side elevational view of a third embodiment of the invention with a pulling section thereon;

FIG. 7 is a side elevational view of a fastener which may be used in the invention;

FIG. 8 is a front end view of the fastener of FIG. 7;

FIG. 9 is a partial cross-sectional view of the leading end of the fastener of FIGS. 7 and 8;

FIG. 10 is a view illustrating the invention ready for use with the embodiments of FIGS. 4, 5 and 7–7;

FIG. 11 is an enlarged transverse cross-sectional view taken along line 11—11 in FIG. 10;

FIG. 12 is a cross-sectional view taken along line 12—12 in FIG. 11;

FIG. 13 is a view similar to FIG. 10 illustrating the invention being used;

FIG. 14 is a view similar to FIG. 13 after the fastener is in place;

FIGS. 15–17 are views illustrating the invention being used with the embodiments of FIGS. 6–9;

FIG. 18 is an enlarged partial longitudinal cross-sectional view of the fastener-guide member interface of FIGS. 15–17;

FIG. 19 is a view illustrating the fastener installed with the invention locked into place to complete the joint;

FIG. 21 is a partial side elevational view of a streamlined guide member;

FIG. 22 is a cross-sectional view taken along line 22—22 in FIG. 21;

FIG. 23 is a partial side elevational view of a fluted guide member;

FIG. 24 is a cross-sectional view taken along line 24—24 in FIG. 23;

FIG. 28 is a side elevational view of an alternate fastener which may be pulled through the work pieces;

FIG. 29 is a leading end view of the fastener of FIG. 28;

FIG. 30 is a partial side elevational view of a guide member for use with the fastener of FIG. 28;

FIG. 31 is a trailing end view of the guide member of FIG. 30.

FIG. 32 is a longitudinal cross-sectional view taken along lines 32—32 in FIGS. 29 and 31 showing the fastener of FIG. 28 locked onto the guide member of FIG. 30;

FIG. 33 is a side elevational view of a second alternate fastener which may pulled through the work pieces;

FIG. 34 is a partial side elevational view of a guide member for use with the fastener of FIG. 33;

FIG. 35 is a longitudinal cross-sectional view showing the fastener of FIG. 33 locked onto the guide member of FIG. 34; and, FIG. 36 illustrates a method of preloading the fastener joint.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the fastener assembly FA of the invention includes a guide member G and a fastener F. The guide member G preceeds the fastener F through the holes H through work pieces P to transfer the primary expansion load on the holes from the fastener to the guide member. The guide member G further serves to prevent the engagement section on the fastener F from engaging the hole wall as the fastener is placed in the holes to prevent damage thereto.

Figure 3B:
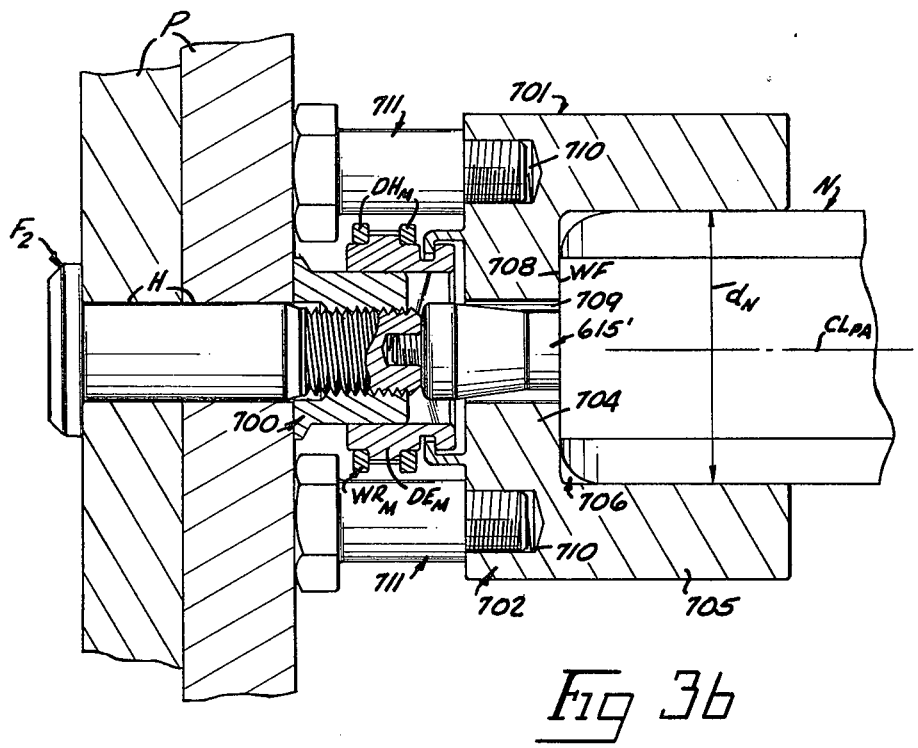
FIG. 3 is a rear end view of that embodiment of the invention seen in FIG. 1.

Referring to FIGS. 1–3, it will be seen that the first embodiment of the guide member G is designated generally by the numeral 10. The guide member 10 has a central axis $A_1$ with a leading end 11 and a trailing end 12. The guide 10 includes a cylindrical pilot section 14 concentric about the axis $A_1$ adjacent the leading end 11 of the member 10 with an expansion section 15 with the trailing end of the pilot section 14 and concentric with respect to the axis $A_1$. A locating pin 16 is integral with and concentrically located about the axis $A_1$ at the trailing end of the expansion section 15. The pilot section 14 serves to maintain the guide member 10 centered in the holes H through the work pieces while the expansion section 15 serves to expand the holes a predetermined amount with the locating pin 16 serving to maintain the leading end of the fastener F concentrically located within the holes H as the fastener F follows the guide member 10 through the holes.

The pilot section 14 defines a cylindrical outside pilot surface 18 thereon of a diameter $d_1$ and a length $L_1$. The diameter $d_1$ is just slightly less than the initial nominal hole diameter $D_I$ through the work pieces P so that the pilot section 14 will just slidably pass into the initial holes H to center the axis $A_1$ on the centerline CL of the holes H. The length $L_1$ of the pilot section 14 is sufficient to support the guide member 10 against cocking as it is forced through the holes H and is usually about the same as the total thickness T of the work pieces P through which the holes H extend.

The expansion section 15 defines an outwardly tapering expansion surface 19 on the leading end thereof which tapers outwardly from the leading end toward the trailing end of the member 10. The expansion surface 19 is illustrated as frusto-conical, however, it is to be understood that other shaped surfaces may be used. The minimum diameter $d_2$ of the leading end of the expansion surface 19 is substantially equal to the diameter $d_1$ of the pilot section 14 so that the surface 19 is smoothly joined to the surface 18 through a lead-in transition surface 20. The surface 19 has a major diameter $d_3$ at the trailing end thereof which is a prescribed amount larger than the initial diameter $D_I$ o the holes H through the work pieces. The amount that diameter $d_3$ is larger than the diameter $D_I$ is determined by the amount it is desired to enlarge the diameter of the holes as the guide member 10 passes therethrough. To obtain optimum coldworking, the holes H are usually expanded 2–10% of the final diameter of the holes and depends on the material being expanded. The expansion section 15 further includes a generally cylindrical land surface 21 with a diameter $d_4$ substantially equal to the diameter $d_3$. The surface 21 is joined to the surface 19 through a smooth trailing transition surface 22. The trailing end of the expansion section 15 defines a rearwardly facing annular abutment face 40 concentrically located with respect to the axis $A_1$ and surrounding the base of the locating pin 16. The surface 40 has an outside diameter $d_5$ which is less than the diameter $d_4$ that is adapted to be engaged by a leading end of the fastener F as will become more apparent. The expansion section 15 further defines a clearance surface 41 joined to the peripheral edge of the surface 40 and extending forwardly and outwardly therefrom at an angle $A_c$ with the plane of surface 40 to provide clearance for the leading end of the fastener F as will become more apparent. The angle $A_c$ may be varied as required to prevent damage to the leading end of the fastener, however, an angle $A_c$ of 5°–15° is usually sufficient. The outer periphery of the clearance surface 41 joins with the land surface 21 through a smoothly rounded contraction surface 25 over which the expanded material about the holes H recovers as the guide member 10 passes through the holes as will become more apparent.

The locating pin 16 includes a projection 45 defining an outside cylindrical locating surface 46 thereon concentric about the axis $A_1$ with an outside diameter $d_6$ that fits within the leading end of the fastener F as will become more apparent. It will further be noted that the locating pin 16 projects rearwardly of the abuttment surface 40 a prescribed distance $L_3$ as will become more apparent.

SECOND EMBODIMENT

Referring to FIGS. 4, 5 and 10–14, it will be seen that the second embodiment of the guide member G is designated generally by the numeral 110. The guide member 110 operates similarly to guide member 10 and has a central axis $A_1$ with a leading 111 and a trailing end 112. The guide member 110 includes a cylindrical pilot section 114 concentric about the axis $A_1$ adjacent the leading 111 of the member 110 with an expansion section 115 integral with the trailing end of the pilot section 114 and concentric with respect to the axis $A_1$. A locating pin 116 is concentrically located about the axis $A_1$ at the trailing end of the expansion section 115. The pilot section 114 serves to maintain the guide member 110 centered in the holes H through the work pieces while the expansion section 115 serves to expand the holes a predetermined amount with the locating pin 116 serving to maintain the leading end of the fastener F concentrically located within the holes H as the fastener F follows the guide member 110 through the holes.

The pilot section 114 defines a cylindrical outside pilot surface 118 thereon of a diameter $d_{10}$ and a length $L_{10}$. The diameter $d_{10}$ is just slightly less than the initial nominal hole diameter $D_I$ through the work pieces P so that the pilot section 114 will just slidably pass into the initial holes H to center the axis $A_1$ on the centerline CL of the holes H. The length $L_{10}$ of the pilot section 114 is sufficient to support the guide member 110 against cocking as it is forced through the holes H and is usually about the same as the total thickness T of the work pieces P through which the holes H extend.

The expansion section 115 defines an outwardly tapering expansion surface 119 on the leading end thereof which tapers outwardly from the leading end toward the trailing end of the member 110. The expansion surface 119 is illustrated as frusto-conical, however, it is to be understood that outer shaped surfaces may be used. The minimum diameter $d_{20}$ of the leading end of the expansion surface 119 is substantially equal to the diameter $d_{10}$ of the pilot section 114 so that the surface 119 is smoothly joined to the surface 118 through a lead-in transition surface 120. The surface 119 has a major diameter $d_{30}$ at the trailing end thereof which is prescribed amount larger than the initial diameter $D_I$ of the holes H through the work pieces. The amount that diameter $d_{30}$ is larger than the diameter $D_I$ is determined by the amount it is desired to enlarge the diameter of the holes as the guide member 110 passes therethrough. The expansion section 115 further includes a generally cylindrical land surface 121 with a diameter $d_{40}$ substantially equal to the diameter $d_{30}$. The surface 121 is joined to the surface 119 through a smooth trailing transition surface 122. The trailing end of the expansion section 115 dfines a rearwardly facing bearing face 124 thereon generally normal to axis $A_1$. The outer periphery of the bearing face 124 joins with the trailing end of land surface 121 through a smoothly curved contraction surface 125 over which the expanded material about the holes H recovers when the guide member 110 passes through the holes as will become more apparent. The expansion section 115 also defines a passage 126 therein concentric about axis $A_1$. The passagee 126 opens onto the bearing face 124 and extends forwardly thereof a presecribed distance $L_{41}$. The passage 126 is internally threaded with a nominal diameter $d_{41}$ as will become more apparent.

The locating pin 116 is carried by passage 126. Pin 116 includes a body 130 which has an externally threaded connector section 131 on the leading end thereof of nominal diameter $d_{41}$ so that the connector section 131 can be screwed into the threaded passage 126 to align the central axis $A_2$ of pin 116 coaxially with the central axis $A_1$. The trailing end of the connector section 131 is integral with a wrenching section 132 concentric with axis $A_2$. Wrenching section 132 defines wrenching surfaces 134 about its periphery adapted to be engaged by a conventional wrench (not shown) to install and remove the pin 116 in guide member 110. The leading side of the wrenching section 132 defines a bearing shoulder 135 about the connector section 131 normal to axis $A_2$ which bears against the bearing face 124 on the expansion section 115. The trailing side of the wrenching section 132 defines a rearwardly facing annular abuttment face 140 thereon concentrically located about axis $A_2$ with an outside diameter $d_{50}$ less than diameter $d_{40}$ and the maximum width $w_{51}$ of the section 132 as will be explained. The abuttment surface 140 is adapted to be engaged by the leading end of fastener F as will become more apparent. A clearance surface 141 joins the outer peripheral edge of surface 140 and the outer periphery of the wrenching section 132. Surface 141 extends outwardly and forwardly of the plane of surface 140 at an angle $A_c$ to provide clearance for the leading end of the fastener F as will become more apparent. The angle $A_c$ may be varied as required to prevent damage to the leading end of the fastener, however, an angle $A_c$ of 5°–15° is usually sufficient. The locating pin 116 further includes a locating projection 145 integral with and projecting rearwardly from the wrenching section 132 concentrically about axis $A_2$ with a length $L_{30}$ as will become more apparent. The projection 145 defines an outside locating surface 146 concentric about axis $A_2$ which fits in and locates the leading end of fastener F as will become more apparent. While different surface shapes may be used, the surface 146 is cylindrical with a diameter $d_{60}$. The abuttment surface 140 projects from the locating surface 146 outward.

THIRD EMBODIMENT

The third embodiment of the guide member is designated 210 and seen in FIGS. 6 and 15–18. This embodiment has the same features as the member 10 and in addition has a pulling section 260 on the leading end of the pilot section 214. Those components of member 210 which are common with member 10 have the same reference numbers applied thereto displaced by 200.

The pulling section 260 is integral with the leading end of the pilot section 214 and concentric about axis $A_1$. The section 260 is provided with appropriate lands 261 and grooves 262 to be gripped by a conventional lockbolt installation gun (not shown) with an appropriate nose assembly N partly shown in FIGS. 15–17. The major diameter $d_m$ of the pulling section 260 is at least as small as the diameter $d_1$ of surface 218 and usually slightly smaller to prevent damage to the holes H as the section 260 is inserted therethrough. The pulling section 260 has an appropriate length $L_p$ to allow the section 260 to project through the holes sufficiently far to be engaged by the nose assembly N as will become more apparent.

STANDARD FASTENER

The fastener F is best seen in FIGS. 7–19 and is illustrated as a conventional fastener with an internal wrenching socket in the leading end thereof such as that disclosed in U.S. Pat. No. 2,940,495 and sold commercially by Hi-Shear Corporation under their trademarks "Hi-LoK" and "Hi-Tigue". It is to be understood, however, that various fasteners may be modified for use in the invention.

The fastener F includes a head 300 at the trailing end thereof concentric about its central axis $A_f$, a bearing section 301 integral with the head 300 and projecting therefrom concentric with axis $A_f$, and an engagement section 302 at the leading end of bearing section 301 and concentric about axis $A_f$. The head 300 has a diameter $D_H$, the bearing section 301 has a nominal diameter $D_B$ and the engagement section 302 has a major diameter $D_E$. The diameters $D_H$, $D_B$ and $D_E$ are those normally associated with the particular standard size fastener. The diameter $D_E$ is usually smaller than diameter $D_B$ by 0.004—0.007 inch as is known. The engagement section 302 is usually joined to the bearing section 301 through a smooth transition section 304.

The leading end 305 of the engagement section 302 is provided with a passage 306 which opens onto the end 305 and which is concentric with axis $A_f$. The passage 306 has been broached into an internal socket 308 with internal wrenching surfaces 309 along the length $L_s$ thereof. The wrenching surfaces 309 have a minor opening $O_I$ and a major opening $O_M$ as seen in FIG. 8. The passage 306 is countersunk at 310 to provide a lead-in to socket 308. The leading end 305 defines an annular leading face 311 thereon outboard of coutersink 310 and oriented normal to axis $A_f$. The leading face 311 has an inside diameter $d_{FI}$ at countersink 310 and an outside diameter $d_{FO}$ at the root of the outside chamfer 312 on the leading end 305.

The engagement section 302 is illustrated with external threads 314 adapted to be engaged by a conventional nut 315 seen in FIG. 19, however, different engagement surfaces may be provided. The crest diameter of the threads 314 is the diameter $D_E$. It will further be noted that the root diameter $d_{RT}$ of threads 314 is at least as large as the outside diameter $d_{FO}$ of the leading face 311 and is usually slightly larger than this diameter as illustrated in FIG. 9. This alloows a bearing force to be applied to the leading face 311 without damage to the leading thread 314 because the force is carried through the roots of the threads.

TOOL OPERATION

Figure 20:
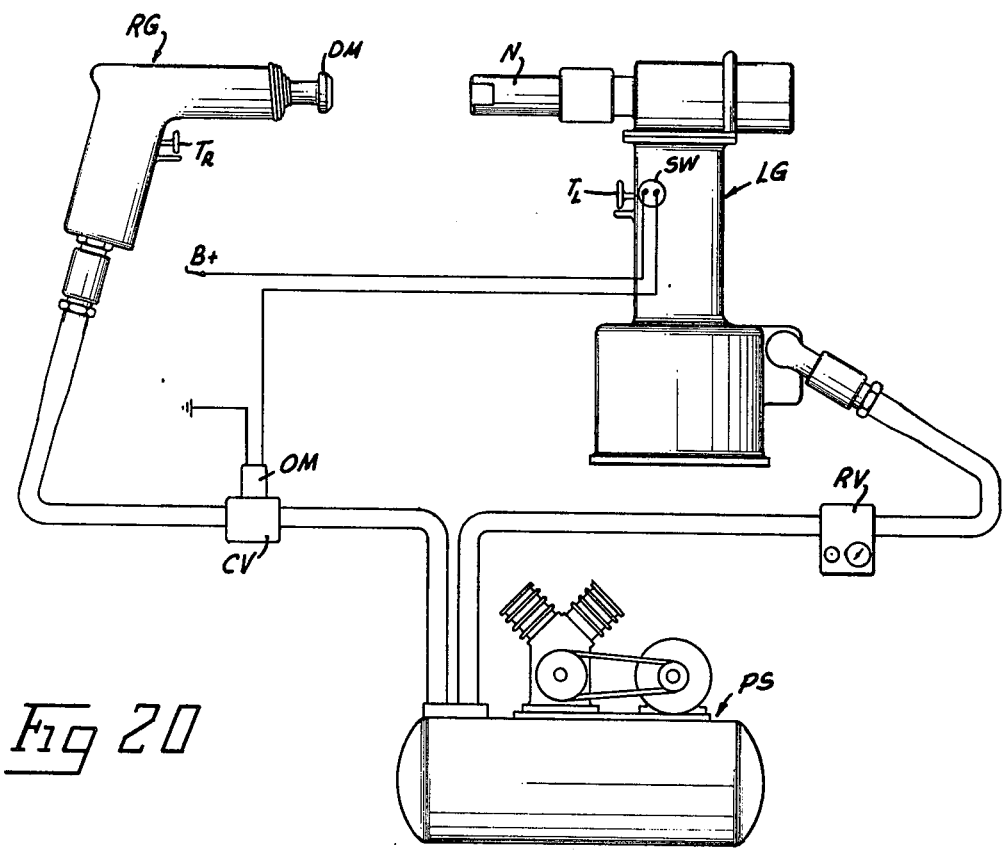
FIG. 20 is a schematic view of the tools for carrying out the method of the invention

One arrangment for exerting a pushing and pulling force on the fastener assembly FA is illustrated in FIG. 20 and designated generally TA. The arrangement TA includes a conventional lockbolt installation gun LG which carries nose assembly N and a conventional rivet gun RG which carries driving member DM. The lockbolt gun has an activating trigger $T_L$ and the rivet gun RG has an activating trigger $T_R$ The lockbolt gun LG is connected to a conventional fluid pressure source PS through an adjustable regulator valve RV annd therivet gun RG is connected to the fluid pressure source PS through a cut-off valve CV with an operating mechanism OM. The cut-off valve CV serves to diable the rivet gun RG until the lockbolt gun LG is activated to prevent the work pieces from carrying the full load of the rivet gun. The operating mechanism OM is appropriately connected to the lockbolt gun LG so that valve CV supplies fluid under pressure to the rivet gun RG when the lockbolt gun is activated. One such connection is illustrated as a switch SW electrically connected to mechanism OM as a solenoid.

OPERATION

Because the first two embodiments of the invention are used similarly, the operation of only the second embodiment will be described in detail, it being understood that the first embodiment will be used similarly. Referring to FIGS. 10–14, the second embodiment of the fastener assembly FA is illustrated.

There is a definite relationship between the diameter $D_B$ of the bearing section 301 and the diameter $D_E$ of the engagement section 302 of the fastener F, the diameter $d_{30}$ of the expansion section 115 and the diameter $d_1$ of the pilot section 114 of the guide member 110, the initial hole diameter $D_I$, the recovered hole diameter $D_R$ of the holes H after passage of the guide member 110 therethrough, and the final interference hole diameter $D_f$ when the fastener is installed in the holes. Usually, the diameter $D_B$ of the bearing section of the fastener is the controlling diameter since it is desirable to use a standard size fastener F. Thus, if it is desirable to place the bearing section 301 of the fastener F into an interference fit of a prescribed amount such as 0.003 inch, then the recovered hole diameter $D_R$ must be 0.003 inch less than the diameter $D_B$ of the bearing section of the fastener. When the material of the work pieces P is known, the recovered hole diameter $D_R$ can be predicted and this determines the major diameter $d_{30}$ of the expansion section 115 of the guide member 110. The diameter $d_{30}$ can be calculated to be that amount larger than the recovered hole diameter $D_R$ to make the recovered hole diameter $D_R$ the desired amount smaller than the diameter $D_B$ of the bearing section of the fastener F. Once the diameter $d_{30}$ is determined, the initial hole diameter $D_I$ can be determined and is that amount less than the maximum expansion of the holes as determined by the diameter $d_{30}$ by which it is desired to expand the holes. Usually, the amount the holes H are to be expanded is set by available coldworking data. Once the initial hole diameter $D_I$ is determined, this determines the diameter $d_1$ of the pilot section 114 of the guide member 110. The diameter $D_E$ of the engagement section 302 of the fastener F is usually standard but is less than the recovered hole diameter $D_R$ to prevent the engagement section 302 from scratching the inside of the holes H as it passes therethrough. For instance, if a 5/16 inch fastener is to be installed and it is desirable that the fastener bearing diameter $D_B$ of 0.311 inch is to be in interference of 0.003 inch through 7075-T6 aluminum, then the diameter $d_{30}$ should be 0.315 inch to produce a recovered hole diameter $D_R$ of 0.308 inch where the initial hole diameter is 0.300 inch. Thus, the diameter $d_1$ of the pilot section 114 should be just slightly less than the intial hole diameter $D_I$ or 0.299 inch. For the standard size 5/16 inch fastener the engagement diameter $D_E$ would be 0.304 inch which is sufficiently less than the recovered hole diameter $D_R$ to allow the engagement section 302 to pass through the recovered holes H without scratching same. It will also be appreciated that the diameter $d_{60}$ of the locating surface 146 is substantially equal to the minor opening $O_I$ of the wrenching surfaces 309 in the leading end of the fastener F. This is so that the locating surface 146 will be in bearing contact with the wrenching surfaces 309 as best seen in FIGS. 11 and 12. It is also to be noted that the locating surface 146 could be made to conform in shape to the wrenching surfaces 309 without departing from the scope of the invention or that a passage 306 could be formed in the leading end of a fastener which did not have the socket 308.

The fastener assembly FA is shown ready for use in FIG. 10 with the guide member 110 positioned through the holes H until the near side NS of the work pieces P about the holes H engages the expansion surface 119 of the expansion section 115 on the guide member 110. The fastener F is positioned so that the locating surface 146 as best seen in FIG. 12 is in bearing contact with the wrenching surfaces 309 in the socket 308. With the fastener assembly FA in this position, a driving member $D_M$ as seen in FIG. 13 is placed on the head 300 of the fastener F to force the guide member 110 and the fastener F through the holes H. Where it is desirable to significantly expand the holes H, an annular bucking bar BB may be applied against the offside OS of the work pieces P when the driving member DM forces the fastener F and the guide member 110 through the holes H. While various driving members $D_M$ may be used, the member illustrated is attached to a conventional rivet gun (see FIG. 20) and has an appropriate driving recess DR in the end thereof to engage the head 300 on the fastener F. As the guide member 110 is forced through the holes H, the expansion surface 119 expands the holes H to the diameter $d_{30}$, and, if the diameter $d_{30}$ is sufficiently larger than the initial hole diameter $D_I$, the holes will be coldworked to induce a compressive stress gradient therearound. As the land surface 121 passes through the holes H, the expanded holes H recover around the contracting surface 125 to the recovered diameter $D_R$. Because the diameter $D_E$ of the engagement section 302 is smaller than the recovered diameter $D_R$ of the holes H and because the locating pin 116 maintains the leading end of the fastener F concentric about the hole centerline CL, the engagement section 302 of the fastener F passes through the recovered holed H without damaging the surface thereof. As the bearing section 301 passes into the recovered holes H, the holes are re-expanded by the lead-in surface 304 thereon out to the diameter $D_B$ of the bearing section 301. This operation continues until the fastener F is fully seated in the holes H as seen in FIG. 14 where the guide member 110 drops from the leading end of the fastener F and a locking member such as the nut 315 is then ready to be installed on the engagement section 302 with the diameter $D_f$ of the holes H being the same as the diameter $D_B$ of the bearing section 301. The nut 315 is then installed in conventional manner as illustrated in FIG. 19 to lock the fastener F in place.

It will further be noted that the diameter $D_{50}$ of the abutment face 140 on locating pin 116 is substantially equal to the outside diameter $d_{F0}$ of the leading face 311 on the fastener F as best seen in FIG. 12 so that the leading thread 314 on the engagement section 302 will not be damaged as the fastener F is used to drive the guide member 110 through the work pieces P. This is insured by the clearance surface 141 angling forward of the face 140 at the angle $A_c$.

Referring now to FIGS. 15–18, the installaation of the invention using the guide member 210 is illustrated. The relative dimensions of the corresponding parts would be determined as indicated above. As seen in FIG. 15, the guide member 210 is inserted through the holes H in the work pieces P so that the pulling section 260 projects beyond the offside OS of the work pieces P and the expansion surface 219 of the expansion section 215 engages the near side NS of the work pieces P about the holes H. The lockbolt installation gun (LG seen in FIG. 20) with the nose assembly N is then inserted over the projecting end of the pulling section 260 so that the nose assembly N engages the pulling section 260 by engaging the lands 261 and grooves 262 in known manner as seen in FIG. 15. The leading end of fastener F is then inserted into the locating pin 216 of guide member 210 as bese seen in FIG. 18 so that the fastener is axially aligned with the guide member 210. The driving member $D_M$ on rivet gun RG seen in FIG. 20 is then brought into contact with the head 300 of the fastenerr F so thata the fastener F and guide member 210 will be forced through the holes H by activating the lockbolt gun LG and the rivet gun RG which drives the driving member $D_M$. The driving member $D_M$ keeps the fastener F moving into the holed H as the guide member 210 progresses therethrough under the influence of the nose assembly N.

It is to be understood that there are alternate ways in which the fastener assembly FA in FIG. 15 may be installed. One way is to set the operating pressure of the lockbolt gun carrying the nose assembly N sufficiently high using the regulator RV in FIG. 20 so that the nose assembly N exerts a sufficient force on the guide member 210 to force the expansion section 215 through the holes H to enlarge them while the driving member $D_M$ is used to only push the fastener into the holes H while maintaining the locating pin 216 within the socket 308 in the leading end of the fastener F. Alternatively, the operating pressure on the lockbolt gun carrying the nose assembly N may be set sufficiently low, again using the regulator RV, so that the force exerted on the guide member 210 will not be quite sufficient to force the expansion section 215 through the holes H. The additional pressure necessary to force the guide member 210 through the holes H is supplied by the rivet gun RG through the driving member $D_M$ and the fastener F so as to insure that the fastener F will be maintained in contact with the locating pin 216 but the force required by the driving member $D_M$ to force the fastener F into position is reduced over that required without using the nose assembly N. It will also be noted that in either of these arrangements, the nose assembly N serves as a back-up position to the driving member $D_M$ as the driving member $D_M$ forces the fastener F into the holes H. FIG. 16 shows the guide member 210 passing through the holes H with the holes recovering the diameter $D_R$ followed by the holes being re-expanded to diameter $D_f$ by the transition section 304 on the fastener F. The fastener F is shown fully inserted through the holes H in the work pieces P in FIG. 17 where the guide member 210 is being removed with the nose assembly N and the driving member $D_M$ is being removed from the opposite side. The installation of the fastener F is completed by installing the nut 315 thereon as illustrated in FIG. 19. Again, it will be noted that the clearance surface 241 which corresponds to the surface 41 on the guide member 10 provides adequate clearance of the leading end of the fastener F as seen in FIG. 18 so that the leading thread 314 thereon will not be upset as the fastener F and guide member 210 are driven into posotion.

STREAMLINE EXPANSION SECTION

Figure 25:
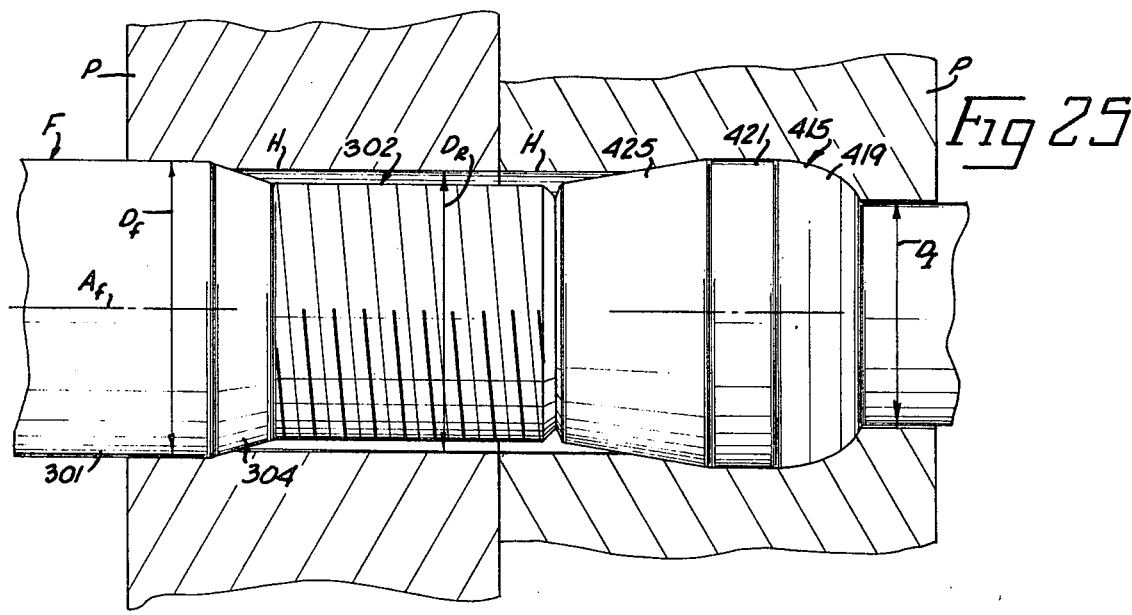
FIG. 25 is a view similar to FIG. 21 showing the streamlined guide member being used.

Referring to FIGS. 21, 22 and 25, an alternate expansion section is illustrated which may be used in lieu of the expansion sections 15, 115 and 215. This alternate expansion section is designated geneally by the reference number 415. Expansion section 415 includes a leading expansion surface 419, an intermediate land surface 421, and a trailing contraction surface 425, all concentric about the central axis $A_1$ of expansion section 415.

The expansion surface 419 has a leading minor diameter $d_{80}$ and a trailing major diameter $d_{81}$ where diameter $d_{80}$ is at least as small as the initial hole diameter $D_I$ and the major diameter $d_{81}$ is greater than the initial hole diameter $D_I$ by that amount which it is desired to expand holes H. If coldworking is desired, diameter $d_{81}$ is usually 2–10% greater than the hole diameter $D_I$ depending on the material of the work pieces P and the final diameter $D_f$ desired. The expansion surface 419 is semi-ellipsoidal in shape where the included angle between the tangent to surface 419 at any point decreases from the leading to the trailing end of surface 419. It will be seen that such shape for surface 419 produces an exponentially increasing mechanical advantage at the surface 419/hole interface from the leading to the trailing end of surface 419. This serves to minimize the frictional interface between the surface 419 which, in turn, reduces the force required to move the surface 419 through the holes H. Because the radial expansion forces required to expand the holes H increase exponentially with the amount of expansion, the exponentially increasing mechanical advantage of surface 419 offsets the expansion forces required to reduce force required to move the surface 419 through holes H.

The land surface 421 is cylindrical with the diameter $d_{81}$ and a length $L_{81}$. The leading end of surface 421 is joined to expansion surface 419 through a smooth transition surface 422. The length $L_{81}$ is a convenient length which allows the surface 419 to be reground without reducing diameter $d_{81}$, however, it will be noted that the length $L_{81}$ will be shortened each time the expansion surface 419 is reground.

The contraction surface 425 has the major diameter $d_{81}$ at its leading end and a minor diameter $d_{82}$ at its trailing end. The diameter $d_{82}$ is at least as small as the recovered diameter $D_R$ of the holes H. The surface 425 has an effective surface area larger than that of the expansion surface 419 and an average mechanical advantage greater than that of surface 419. While different shapes may be used for surface 425, it is illustrated as frusto-conical defining an included angle in the axis $A_1$ less than the average included angle between the tangents to surface 419 and the axis $A_1$. The leading end of surface 425 is joined to land surface 421 through a smooth transition surface 427. As the compressive forces tending to force the holes H closed toward the recovered diameter $D_R$ are applied against the contraction surface 425 as seen in FIG. 25, these forces tend to force the expansion section 415 through the holes H. This results in reducing the force required to move the section 415 through the holes.

Any of a number of different lubricants may be used to coat the expansion, land and contraction surfaces of the guide members shown herein. One lubricant which may be used is an electroplated film such as cadmium. This film flows under coldworking pressure to act as a lubricant and may be replenished by replating these surfaces. Also, a wax may be used as the lubricant. Various dry film lubricants may also be used such as the layer lattice compounds of molybdenum disulfide ($MoS_2$), tungsten disulfide ($WS_2$), graphite, and graphite floride ($CF_x$); the plastic polyimide polymers; or the calcium floride based coatings.

The material used to make the expansion sections of the guide members may also be self-lubricating. Alloy steels which contain free graphite are such materials. These alloy steels usually contain a relatively high carbon content, normally 1.4–1.5%, and silicon, normally 0.5–1.5% to promote the formation of microscopically fine particles of the free graphite. Other alloying elements such as manganese and molybdenum may be used to stabilize the formation of the free graphite. Such steels have the necessary hardness and strength to withstand the forces required for hole expansion. One such steel alloy which has been found satisfactory typically contains 1.45% carbon, 1.25% silicon; 1% maximum manganese and 0.25% maximum molybdenum.

Referring to FIGS. 23, 24 and 26–27, a second alternate expansion section is illustrated which may be used in lieu of the expansion sections 15, 115 and 215. This alternate expansion section is designated generally by the reference number 515. Expansion section 515 includes a leading expansion surface 519. An intermediate land surface 521, and a trailing contraction surface 525, all concentric about the central axis $A_1$ of expansion section 515.

Figure 26:
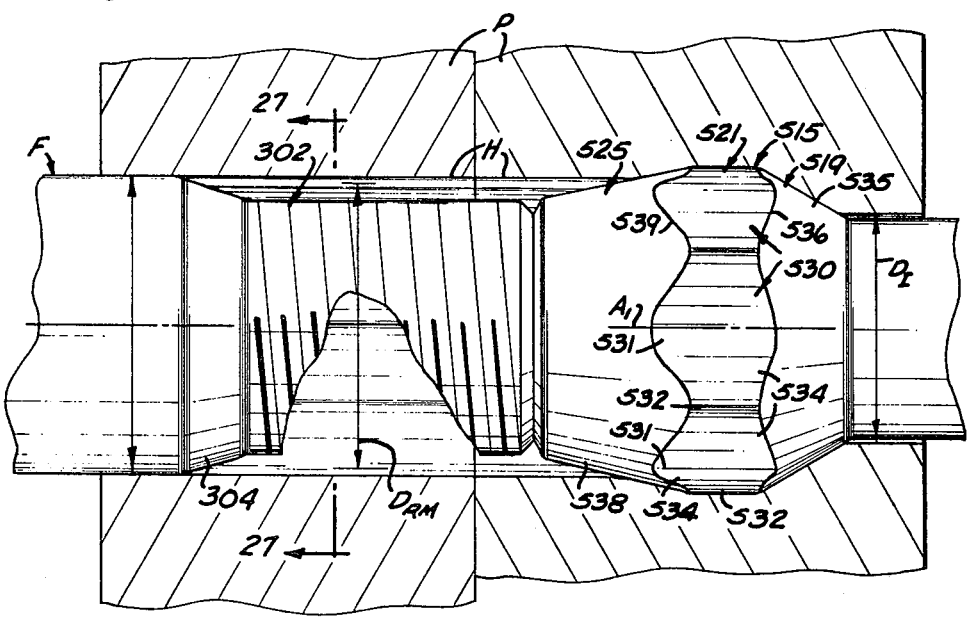
FIG. 26 is a view similar to FIG. 23 showing the fluted guide member being used.

The expansion surface 519 has a generally frusto-conical shape with a leading minor diameter $d_{90}$ at least as small as the initial hole diamter $D_I$. The surface 519 further has a trailing means major diameter $d_{91}$ greater than the initial hole diameter $D_I$ by that amount greater than the initial hole diameter $D_I$ which it is desired to expand holes H as will become more apparent. The land surface 521 has a generally cylindrical shape with the mean major diameter $d_{91}$. The contraction surface 525 is also generaaly frusto-conical in shape with the mean major diameter $d_{91}$ at its leading end and a minor diameter $d_{92}$ at its trailing end at least as small as the minor recovered hole diameter $D_{R1}$ as seen in FIG. 26. It will be noted that the above shapes are to be taken in the overall or gross sense as will become more apparent.

The surfaces 519, 521 and 525 are fluted at circumferentially spaced points with each of the flutes 530 having a longitudinally extending axis $A_f$ generally parallel to the axis $A_1$ of section 515. Each flute 530 opens onto the expasion surface 529 at its leading end, onto the contraction surface 525 at its trailing end and onto the land surface 521 along its side edges. As best seen in FIG. 24, each flute 530 has a depth $d_{94}$ and divides the land surface 521 into longitudinally extending concave base subsurfaces 531 and longitudinally extending convex crest subsurfaces 532. The subsurfaces 531 and 532 are joined by longitudinally extending smooth transition subsurfaces 534. The crest subsurfaces 532 define a maximum major diameter $d_{95}$ and the base subsurfaces 531, 532 and 534 is $d_{91}$. The subsurfaces 531, 532 aand 534 are joined to the frusto-conical expansion subsurface 535 of expansion surface 519 by smooth leading transition subsurface 536, and the trailing ends of subsurfaces 531, 532, and 534 are joined to the frusto-conical contraction subsurface 538 by smooth trailing transition subsurface 539.

Figure 27:
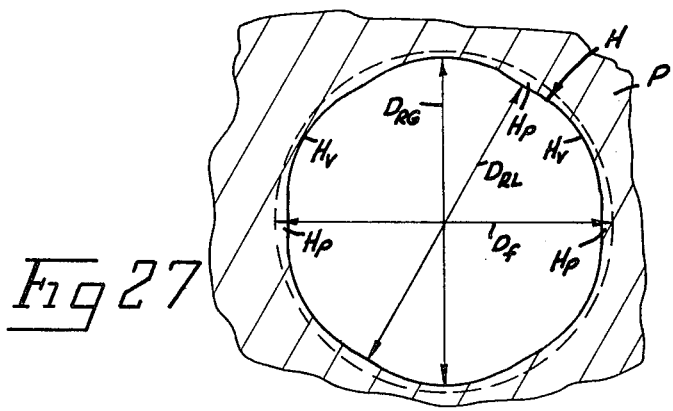
FIG. 27 is a cross-sectional view taken along line 27—27 in FIG. 26.

FIGS. 26 and 27 illustrate the expansion section 515 in use. As seen in FIG. 26, the expansion section 515 precedes the fastener F through the holes H similarly to that previously disclosed for the other expansion surfaces. It will be noted, however, that instead of the expansion section expanding the holes H with a circular cross-section, the flutes 530 on the expansion section 515 generate a complimentary fluted surface in the holes H. On the other hand, it will be noted that the bearing section 301 of the fastener F is circular so that the initially fluted hole will be reformed into a circular hole as the bearing section 301 of the fastener F passes into the holes H. The means recovered hole diaamter $D_{RM}$ as seen in FIG. 26 corresponds in size to the recovered hole diameter $D_R$ when using the other embodiments of the invention. The recovered holes H after passage of the expansion section 515 therethrough has a greater recovered diameter $D_{RG}$ in the longitudinally extending valleys $H_V$ as seen in FIG. 27 formed by the crest subsurfaces 532 on the expansion section 515 and a lesser recovered diameter $D_{RL}$ longitudinally extending protuberances $H_P$ formed by the base subsurfaces 531 on the expansion section 515. It will thus be seen that the surface of the holes H are coldworked different amounts by the subsurfaces 531, 532 and 534. As the transition section 304 on the fastener F passes through the recovered holes, however, the inwardly directed protuberances $H_P$ of the holes H are displaced outwardly and circumferentially into the valleys $H_V$ between the protuberances $H_P$ to reform the holes H into a final circular shape as shown by the dashed line in FIG. 27. This serves to reduce the tendency of edge bulges forming in the workpieces P about the holes H.

PULL FASTENER

FIGS. 28 and 29 illustrate a special pull fastener $F_1$ which may be used in lieu of fastener F. Like fastener F, the pull fastener $F_1$ includes a head 600 at the trailing end thereof concentric about its central axis $A_f$, a bearing section 601 integral with the head 600 and projecting therefrom concentric with axis Af, and an engagement section 602 at the leading end of bearing section 601 and concentric about axis $A_f$. The head 600 has a diameter $D_H$, the bearing section 601 has a nominal diameter $D_B$ and the engagement section 602 has a major diameter $D_E$. The diameters $D_H$, $D_B$ and $D_E$ are those normally associated with a particular standard size fastener. The diameter $D_E$ is usually smaller than diameter $D_B$ by 0.004–0.007 inch as is known. The engagement section 602 is usually joined to the bearing section 601 through a smooth transition section 604.

The leading end 605 is provided with a pull passage 606 which opens onto the leading end of fastener $F_1$ and is concentric about axis $A_f$. The passage 606 has a diameter $d_{11}$ and a depth $d_{12}$. A pair of opposed arcuate lips 608 project into the passage 606 at its mouth. The leading edges of lips 608 are flush with the annular driving face 609 on the leading end 605 of the engagement section 302. Each of the lips 608 has an arcuate length $L_{14}$ such that the lip 608 extends for approximately one-fourth of the circumference of the passage 606, and a height $h_{15}$ so that the opposed inside edges of the lips 608 define a generally circular opening 607 therebetween of diameter $d_{16}$ as best seen in FIG. 29.

The opposed end surfaces 610 of each of the lips 608 are radially extending with respect to the passage 606 to define arcuate slots 611 between the ends of the lips that open onto the opening 607. The lips 608 have a thickness $t_{18}$ as seen in FIG. 28 less than the depth $d_{12}$ of passage 606 to define a generally circular chamber 612 in passage 606 behind the trailing edges of lips 608 with a length $L_{19}$. The chamber 612 opens onto opening 607 and slots 611 as will become more apparent.

The leading end 605 defines annular leading face 609 thereon outboard of passage 606 and oriented normal to axis $A_f$. The leading face 609 has an inside diameter $d_{FI}$ at passage 606 and an outside diameter $d_{FO}$ at the root of the outside chamfer 614 on the leading end 605.

The engagement section 602 is illustrated with external threads 613 adapted to be engaged by a conventional nut such as that seen in FIG. 19, however, different engagement surfaces may be provided. The crest diameter of the threads 613 is the diameter $D_E$. It will further be noted that the root diameter $d_{RT}$ of threads 613 is at least as large as the outside diameter $d_{FO}$ of the leading face 609 and is usually slightly larger than this diameter as illustrated in FIG. 32. This allows a bearing force to be applied to the leading face 609 without damage to the leading thread 613 because the force is carried through the roots of the threads.

A pull guide member 615 for use with fastener $F_1$ is shown in FIGS. 30 and 31. The guide member 615 is the same as guide member 210 except for the locating pin. The guide member 615 has a pulling section (not shown), a pilot section (not shown), and an expansion section 616. The expansion section 616 has an expansion surface 618, a land surface 619, a contraction surface 620, a clearance 621 and an abuttment face 622, all concentric about axis $A_1$.

The locating pin 625 projects from the trailing end of the expansion section 616 concentric about axis $A_1$. The pin 625 has a cylindrical locating section 626 with outside diameter $d_{21}$ and a length $L_{22}$. Diameter $d_{21}$ is substantially the same as diameter $d_{16}$ of opening 609 so that section 626 just passes between the lips 608 of fastener $F_1$. The length $L_{22}$ is approximately the depth $d_{12}$ of passage 606 in fastener $F_1$ so that the trailing end 628 of section 626 projects into chamber 612 when the leading face 609 on fastener $F_1$ engages the abuttment face 622. The trailing end of section 626 has a pair of opposed, outwardly projecting flanges 630 thereon with the trailing edges of flanges 630 flush with the trailing end 628 of section 626. Each of the flanges 630 has an arcuate length $L_{24}$ such that the flange extends for approximately one-fourth of the circumference of the section 626 and a height $h_{25}$ substantially equal to the height $h_{15}$ of lips 608 on fastener $F_1$. The flanges 630 define an arcuate channel 631 between the leading edges thereof and the abuttment face 622 with a length $L_{26}$ substantially equal to the thickness $t_{18}$ of lips 608 fastener $F_1$. The flanges 630 have a thickness $t_{28}$ slightly less than the length $L_{19}$ of chamber 612. The outside diameter $d_{29}$ across the flanges 630 is substantially equal to the diameter $d_{11}$ of passage 606.

With the flanges 630 on guide member 615 aligned with slots 611 on fastener $F_1$, the locating pin 625 can be inserted into passage 606 so that the flanges 630 lie in chamber 612 behind the plane of lips 608.

The fastener $F_1$ and guide member 615 are then rotated 90° with respect to each other so that the flanges 630 can pass behind lips 608 as seen in FIG. 32. The fastener $F_1$ is then positively locked onto guide member 615 so that the fastener $F_1$ will be pulled into the holes through the work pieces behind the guide member 615 while the fastener is coaxially aligned with the guide member.

An alternative pull fastener $F_2$ is seen in FIG. 33 which may be used in lieu of fastener $F_1$. Those portions of fastener $F_2$ common with fastener $F_1$ have like reference numerals applied thereto.

The leading end 605 is provided with a generally cylindrical pull passage 650 which opens onto the leading end of fastener $F_1$ and is concentric about axis $A_f$. The passage 650 has a diameter $d_{31}$ and a depth $d_{32}$. The passage 650 is internally threaded to provide pulling threads 651.

A pull guide member 615' for use with fastener $F_2$ is illustrated in FIG. 34. Those portions of guide member 615' common with guide member 615 have like reference numbers applied thereto. The locating pin 652 on the trailing end of expansion section 616 has a generally cylindrical locating projection 654 concentric about axis $A_f$ and a length $L_{34}$ less than the depth $d_{32}$. The projection 654 is externally threaded with threads 655 to enage threads 651 in passage 650 on fastener $F_2$. The diameter $d_{35}$ of projection 654 is such that it can be screwed into passage 650 as seen in FIG. 35. The fastener $F_2$ is then positively locked onto guide member 615' so that the fastener $F_2$ will be pulled into the holes through the work pieces behind the guide membr 615' while the fastener is coacially aligned with the guide member.

The pull guide membrs 615 and 615' may be used to preload the fastner joint as illustrated in FIG. 36. After the pull fastener has been seated in the holes through the work pieces, the pull guide member is removed and a nut such as nut 700 screwed onto the threads 613 of fastener until it is just before bearing on the off side of the work pieces as seen in FIG. 36.

The pull guide member (member 615'being shown) is then reattached to the fastener and a preload adapter 701 placed over the projecting guide member.

The preload adapter 701 includes generally a main body 702 with a centerline $CL_{PA}$. The main body 702 includes an end bearing wall 704 oriented generally perpendicular to the center line $CL_{PA}$ and an annular guide wall 705 integral with and extending outwardly from one side of the bearing wall 704 concentrically about the centerline $CL_{PA}$. Thus, it will be seen that a guide chamber 706 is defined by wall 705 and wall 704 with a diameter $d_N$ which is sufficient to just receive the nose assembly N of the lockbolt pulling un therein so that the working face WF of the nose assembly N bears against the bearing surface 708 in chamber 706 and the pull guide member passes through a central passage 709 therethrough concentrically arranged about the centerline $CL_{PA}$. At least a pair of internally threaded holes 710 are defined in the bearing wall 704 on diametrically opposite edges of the opposed face of the bearing wall 704 and should bolts 711 are provided to be screwed into the passages 710 to space the bearing wall 704 a prescribed distance from the workpieces P. The shoulder bolts 711 may be acquired in different lengths so that the distance that the bearing wall 528 is spaced from the work pieces P can be varied.

While a conventional wrench may be used with the adapter 701, a modified wrench $WR_M$ is shown in FIG. 36 which is captivated onto the adapter 701 and forms a part thereof. The wrench $WR_M$ has a nut driving element $DH_M$ which is rotatably mounted on the driving handle $DH_M$ so that the driving element $DE_M$ can ratchet in one direction and drive in the other as the handle $DH_M$ is rotated. It will be seen that the offside of the driving element $DE_M$ defines an annular retaining recess and an annular retaining flange is provided on the bearing wall 704 which captivates wrench $WR_M$ so that the driving element $DE_M$ is freely rotatable with respect to the body 702 yet the driving element axis is maintained coaxially with the centerline $CL_{PA}$. It will thus be seen that the shoulder bolts 540 also serve to locate the wrench $WR_M$ with respect to the fastener $F_2$.

With the wrench $WR_M$ engaging nut 700 the nose assembly N is then reinserted back over the guide member 615' until its working face WF bears against the bearing surface 708 on bearing wall 704. The working pressure to the lockbolt installation gun is adjusted in known manner to exert a prescribed minimum preload force on the fastener $F_2$ through the guide member 615 and nose assembly N. One way to set the minimum preload force is using a conventional force gauge especially adapted for use with lockbolt installation guns. The installation gun is activated to preload the fastener $F_2$ and the wrench $WR_M$ used to tighten the nut 700 while this preload is maintained. The nut 700 thus locks the preload into the fastener $F_2$ to assure the desired preload on the joint. After the nut 700 is tightened to lock the preload in the joint, the nose assembly N and adaptor 701 are removed. The guide member 615' can then be removed to finish the joint.

While specific embodiments of the invention have been disclosed herein, it is to be understood that full use of modifications, substitutions and equivalents may be made without departing from the scope of the invention concept as disclosed herein:

I claim:
1. A method of forming a fastener joint comprising the steps of:
  a. inserting a guide member in the holes through the work pieces where the guide member has a pilot section with a diameter such that the pilot section is slidably received through the holes at their initial diameter and locates the central axis of the guide member substantially coaxially with the centerline of the holes, and an expansion section with a major diameter larger than the initial diameter of the holes;
  b. coaxially aligning a fastener to be installed in the holes with the leading end of the fastener at the trailing end of the guide member; and,
  c. forcing the guide member through the holes and the fastener into the holes with the guide member immediately preceding the fastener through the holes.

2. The method of claim 1 wherein step (c) includes exerting a pushing force on the fastener.

3. The method of claim 2 wherein step (c) further includes exerting a pulling force on the guide member.

4. The method of claim 3 wherein step (c) further includes applying the pushing force to the fastener simultaneously with the application of the pulling force to the guide member.

5. The method of claim 4 wherein the pulling force applied to the guide member is insufficient to force the guide pin completely through the work pieces and the pushing force on the fastener is sufficient, when combined with the pulling force, to force the guide member through the holes and the fastener into the holes.

6. The method of claim 1 further including the steps
  d. removing the guide member from the fastener;
  e. threading a nut onto the leading end of the fastener;
  f. positively attaching the guide member to the leading end of the fastener;

g. pulling on the guide member to exert a first axial preloading force on the fastener; and,
h. tightening the nut while the first preloading force is exerted on the fastener to lock the first axial preloading force into the resulting fastener joint after the guide member is released.

* * * * *